J. REESE.
Electric Conductor.
No. 240,039.  Patented April 12, 1881.
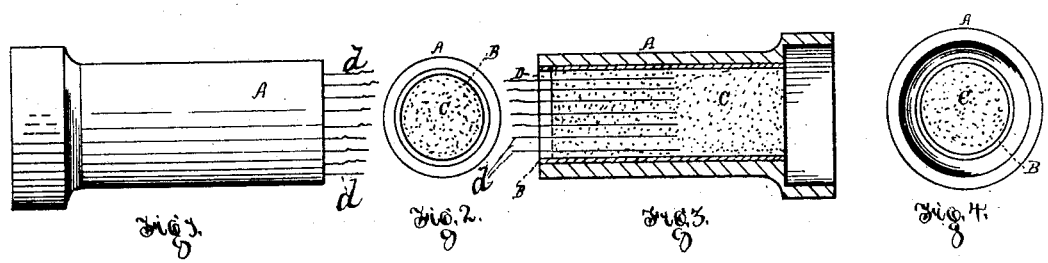
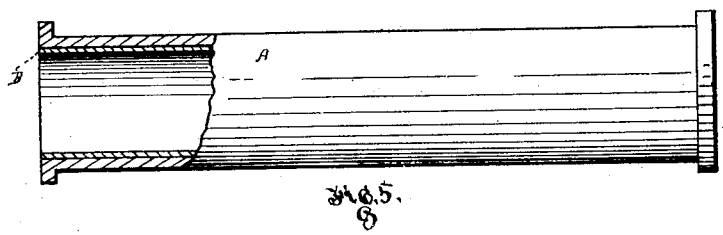
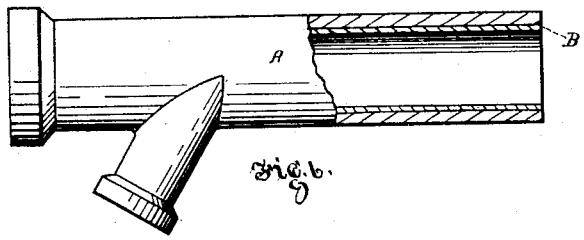
Witnesses
Frank M Reese.
Isaac Reese
Inventor
Jacob Reese

UNITED STATES PATENT OFFICE.

JACOB REESE, OF PITTSBURG, PENNSYLVANIA.

ELECTRIC CONDUCTOR.

SPECIFICATION forming part of Letters Patent No. 240,C39, dated April 12, 1881.

Application filed January 16, 1880.

*To all whom it may concern:*

Be it known that I, JACOB REESE, of the city of Pittsburg, in the county of Allegheny and State of Pennsylvania, have invented a new and useful Electric Conductor; and I do hereby declare the following to be a full, clear, and exact description thereof.

The object of this invention is to provide means for accumulating, equalizing, conveying, and distributing electricity in great volume, whereby currents of constant and uniform volume and intensity may be supplied for lighting, heating, and like purposes in the arts.

Heretofore conductors and reservoirs or accumulators have, in the main, consisted of continuous metallic or non-metallic surfaces, which resulted in limiting the conducting and storing capacity of the devices, as size and weight had to be considered.

My present invention consists in forming the body of the conductor, reservoir, or accumulator of a finely-divided non-metallic substance—such, for instance, as charcoal—said body being properly insulated and charged or tapped by a series of metallic wires or conductors, which extend into and terminate in the body of the finely-divided non-metallic substance. By such means a number of different currents of varying volume and intensity may be united and conveyed in one volume, and a number of independent currents of equal volume and intensity may be withdrawn at pleasure.

Heretofore electricity has been used principally in telegraphing and electric metallurgy, and for these purposes the ordinary telegraph-wire has proven of sufficient capacity and filled the requirements of a conduit for electricity; but now that the public mind has awakened to the possibility of the economical employment of electricity for lighting, heating, and motive purposes, a conduit is desired which will convey a much larger amount of electricity than was required for the preceding purposes.

As fluid percolates through porous matter and as heat radiates through more solid matter, so, also, a portion of electricity escapes from its conductor; hence nearly every element has been carefully examined and classed in proportion to its ability to freely conduct or retard the transit of electricity. In a list of fifteen conductors the best are all metals, well-burned charcoal coming next in order. In a list of twenty-four non-conductors the best are shellac, amber, resins, sulphur, and glass, respectively in the order named.

In practicing the invention hereinafter fully described I make use of a non-metallic conduit; and as charcoal is the best non-metallic conductor, I propose to use it for that purpose, but do not intend to limit the invention to its use, as there are many other non-metallic substances possessing considerable conductive properties.

I shall now describe my invention fully, so that others skilled in the art may make and use the same.

In the construction of a non-metallic conduit for conveying electric fluids in volume and with no or but little waste, the sections of the vessel may be made of iron pipe, as at A, of from, say, three-inch diameter up to any size diameter desired. The pipe-section is well coated externally with tar, asphaltum, or other material capable of rendering it impervious to moisture. It is then coated internally with shellac, resin, or other non-conducting substance, as at B, one of the cheapest and most effective for that purpose being lime, which may be put into the pipe while in a plastic condition; or the section may be formed of well-burned sewer-pipe, or it may be of cement, and be well dried before coating externally and internally.

In constructing the conduit I prefer to use sewer-pipe for its exterior, and in such case the pipe is well burned to exclude all moisture. It is then coated externally with asphaltum and internally with shellac, resin, or lime, the internal coating being light. One of the sections is then taken and placed upon a mandrel having a diameter of about one inch less than the internal diameter of the pipe, thus leaving an annular opening of one-half inch between the walls of the pipe and the surface of the mandrel. Into this annular opening molten sulphur or other good non-conducting material is poured, and when the material has stiffened or set to the proper degree the mandrel is withdrawn, thus leaving the interior of the pipe coated with a non-conducting material of about one-half inch in thickness.

In forming the lining as described it should be made about one-quarter of an inch shorter at each end of the pipe than the pipe itself, so that a space of about one-half inch will be left unlined between the adjacent ends of the sections when placed together. When two sections are placed together in position below the frost-line in the ground, a pasteboard thimble, of a diameter suited to the size of the pipe, and about from three to five inches in length, is inserted within the abutting ends of the pipes, which are then pressed and held firmly together while molten sulphur is run into the bowl, thus forming the joint by filling up the vacant annular space between the adjacent ends and filling up the bowl. As soon as two sections are thus joined together I take well-burned charcoal, finely powdered, and ram it tightly into them, as at C. Additional sections are then lined, placed together, jointed, and rammed, as in the former case, and the operation is thus continued until the desired length of conduit has been formed.

In forming an iron conductor it may be lined with resin and jointed with it also, or the pipe may be coated internally with glass and then lined with shellac or other suitable non-conducting material.

When the conduit has been constructed as described, both ends are closed with glass caps, as at D, having a series of small holes or openings through them for the reception of copper wires $d$, which are embedded in the charcoal at each end of the conduit for a distance of twenty feet or more, and serve as a means for charging the electric fluid into and for tapping it from the conduit. The conduit is also provided from point to point with glass ferrules to insulate tapping-wires at such places; or the conduit may be provided with branches of the same construction as the conduit itself, traversing in different directions, to afford a system of supply, as in the case of water and gas pipes provided with branches for similar purposes. The conduit may also be provided with one, more, or a series of storage-tanks, constructed of iron, brick, or other suitable material, lined with a good non-conductor, and well filled and rammed with dry, well-burned, and finely-powdered charcoal; or the charcoal may be saturated with water, oil, or other fluid-conducting substance. These tanks are provided with a series of wires, which pass into them through glass ferrules and extend into the charcoal; or, if desired, the tanks may be directly attached to the conduit itself. The charcoal in the conduit may also be saturated with a fluid having conductive properties, if desired.

The advantages of the invention are, first, it enables the transit in bulk of electric fluids at a low cost; secondly, but little loss is had during the transit of the fluid; thirdly, a constant, steady, and uniform supply of the electric fluid may be obtained for light, heating, and motive purposes.

I am aware that an insulated tube filled with water has heretofore been suggested as a conductor, and do not claim the same, as it does not present the desired amount of conducting-surface, and is liable to derangement from evaporation, leakage, &c.

Having described my invention, what I desire to claim, and wish to secure by Letters Patent, is—

A conductor, reservoir, or accumulator for accumulating, equalizing, conducting, and distributing large volumes of electricity, consisting of an insulated body of a finely-divided non-metallic substance and a series of insulated metallic conductors or wires which terminate in the body of the said finely-divided non-metallic substance composing the conductor or accumulator, substantially as and for the purpose specified.

In testimony whereof I, the said JACOB REESE, have hereunto set my hand.

JACOB REESE.

Witnesses:
FRANK M. REESE,
GRAHAM SCOTT.